US012579816B2

(12) United States Patent
Li et al.

(10) Patent No.: US 12,579,816 B2
(45) Date of Patent: Mar. 17, 2026

(54) SYSTEMS AND METHODS FOR DETECTING UNKNOWN OBJECTS ON A ROAD SURFACE BY AN AUTONOMOUS VEHICLE

(71) Applicant: TORC Robotics, Inc., Blacksburg, VA (US)

(72) Inventors: Dalong Li, Blacksburg, VA (US); Lei Ge, Blacksburg, VA (US); Juncong Fei, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 300 days.

(21) Appl. No.: 18/221,809

(22) Filed: Jul. 13, 2023

(65) Prior Publication Data

US 2025/0022278 A1     Jan. 16, 2025

(51) Int. Cl.
*G06V 20/56*        (2022.01)
*G01S 17/89*        (2020.01)
*G06V 10/764*       (2022.01)

(52) U.S. Cl.
CPC .............. *G06V 20/56* (2022.01); *G01S 17/89* (2013.01); *G06V 10/764* (2022.01)

(58) Field of Classification Search
CPC ...... G06V 20/56; G06V 20/58; G06V 10/764; G01S 17/89; G01S 17/86; G01S 17/931
See application file for complete search history.

(56) References Cited

U.S. PATENT DOCUMENTS

| | | | |
|---|---|---|---|
| 9,958,870 B1 | 5/2018 | Graybill et al. | |
| 11,776,279 B2 | 10/2023 | Fowe | |
| 2017/0220876 A1* | 8/2017 | Gao ........................ | G06V 10/82 |
| 2018/0259968 A1* | 9/2018 | Frazzoli ................. | G06V 20/58 |
| 2019/0354782 A1* | 11/2019 | Kee ..................... | G06F 18/2321 |
| 2021/0063578 A1* | 3/2021 | Wekel .................. | G01S 17/894 |
| 2021/0150230 A1* | 5/2021 | Smolyanskiy ......... | G06V 10/82 |
| 2022/0081004 A1 | 3/2022 | Brown et al. | |
| 2023/0294737 A1 | 9/2023 | Shi et al. | |
| 2024/0020986 A1 | 1/2024 | Basu | |
| 2024/0037960 A1 | 2/2024 | Basu | |

* cited by examiner

*Primary Examiner* — Stephen G Sherman
(74) *Attorney, Agent, or Firm* — Armstrong Teasdale LLP

(57) ABSTRACT

An autonomous vehicle comprises one or more processors. The processors can be configured to receive, from a sensor of the autonomous vehicle, an image of an environment outside of the autonomous vehicle. The processors can detect potential unknown objects based on the image. The processors can compare the detection based on the image to a set of data points of a LiDAR scan to determine if there are unknown objects on a roadway.

14 Claims, 11 Drawing Sheets

902

900

SYSTEMS AND METHODS FOR DETECTING UNKNOWN OBJECTS ON A ROAD SURFACE BY AN AUTONOMOUS VEHICLE

TECHNICAL FIELD

The present disclosure relates generally to autonomous vehicles and, more specifically, to systems and methods for detecting unknown objects on a road surface by an autonomous vehicle.

BACKGROUND

The use of autonomous vehicles has become increasingly prevalent in recent years, with the potential for numerous benefits, such as improved safety, reduced traffic congestion, and increased mobility for people with disabilities. For safe operation of autonomous vehicles, reliable detection of objects on a roadway is essential. Some methods for object detection are based on machine learning models, which are trained by a large amount of annotated data. Training machine learning models to detect objects reliably requires collecting and adding the objects to a training dataset. Thus, methods for detection of unknown objects to add to the dataset are desirable.

SUMMARY

An automated (e.g., autonomous) vehicle system may not be able to detect and identify unknown objects. For example, detection via LiDAR methods may provide technical difficulties due to a small number of scan points (e.g., for small objects) that are present in a LiDAR scan (e.g., low resolution). Image data captured through a camera may offer a high-resolution solution compared to the LiDAR method, however, false positives may be prevalent due to the small dataset on unknown objects. For example, a machine learning model may take as input the image data and be unable to determine if an object (e.g., tumbleweed) physically on a roadway is debris, a part of the roadway, the background, or another vehicle (e.g., images, stickers, posters on another vehicle). In part, due to the two-dimensional (2D) nature of image data, the machine learning model may not be able to detect and classify objects accurately (e.g., difficult to distinguish background, foreground, and depth of the object).

A computer implementing the systems and methods described herein may overcome the aforementioned technical deficiencies. For example, the computer may operate to receive, from a sensor of an autonomous vehicle, an image of an environment outside of an autonomous vehicle. The computer can detect potential unknown objects based on the image (e.g., using various image processing techniques). However, the potential unknown objects may include false positives (e.g., unknown objects not on a roadway, background objects). To verify the results of the image processing, the computer can compare the results to a LiDAR scan of the surrounding or environment outside of the autonomous vehicle. Based on the comparison, the computer can determine if there are unknown objects on the roadway.

To detect potential unknown objects, the computer can utilize various image processing techniques (e.g., methods). For example, a first method can include using one or more language and/or image based machine learning models. The computer can define multiple text prompts for the machine learning models to detect. The computer can apply the models to the image (e.g., input the image into the models) for object detection (e.g., zero-shot object detection). A second method can include the computer applying one or more segmentation techniques (e.g., panoptic segmentation) to segment the image. The computer can obtain, from the segmentation techniques, a masked image to distinguish the different segments of the image and potential unknown objects. The computer can extract a 2D bounding box for the potential unknown objects on the roadway based on analysis of the masked image (e.g., which objects are surrounded by the segmented road surface). The computer can combine the results from the multiple methods and apply various post-processing techniques to refine the results.

To verify the results of the image processing, the computer can retrieve a set of data points from a LiDAR sensor of the autonomous vehicle, where the set of data points are from a scan by the LiDAR sensor of the surrounding. The computer can generate a first subset of data points by reducing the data points to a three-dimensional (3D) region of interest (ROI). The computer can project the first subset of data points onto the mask image to further reduce the amount of data points (e.g., keeping the data points that belong to road surface or are within the 2D bounding box of any detected objects). The computer can generate a respective subset of the first subset of data points for each detected object, where the respective subsets include the data points for the object and neighboring road surface points within a predefined region. The computer can estimate a ground plane for each respective set and separate (e.g., divide) each respective set into foreground and background points. If the amount of foreground points fail to satisfy a threshold number of data points, then the computer may determine the respective set to be a false positive (e.g., not an unknown object) and discard the respective set. For each respective set that satisfies the threshold number of data points, the computer can generate an estimated 3D bounding box to fit the foreground points. Based on the 3D bounding boxes, the computer may detect unknown objects on the roadway and perform one or more navigational actions (e.g., avoid the object, drive over the object, adjust a speed of the autonomous vehicle, adjust a current route to a destination based on the object). Advantageously, by applying the LiDAR scan to the processed image and detecting unknown objects, the computer may control the autonomous vehicle to perform more efficient route planning, protect the autonomous vehicle from potentially dangerous roadway objects, and increase safety while driving on the road.

In at least one aspect, the present disclosure describes a method that can include receiving, by a processor, from a sensor of an autonomous vehicle, an image of an environment outside of the autonomous vehicle; identifying, by the processor, a mask image for a road surface and an unknown object using a panoptic segmentation model; extracting, by the processor, a two-dimensional bounding box for the unknown object; retrieving, by the processor, a set of data points received from a LiDAR sensor of the autonomous vehicle monitoring the environment of the autonomous vehicle; identifying, by the processor, a first subset of the set of data points corresponding to foreground data points and a second subset of the set of data points corresponding to background data points; and generating, by the processor, using the mask image and the first subset of the set of data points, a three-dimensional bounding box for the unknown object.

In another aspect, the present disclosure describes a system that can include one or more processors configured to execute instructions on a non-transitory computer-readable medium to receive, from a sensor of an autonomous vehicle, an image of an environment outside of the autonomous vehicle; identify a mask image for a road surface and an unknown object using a panoptic segmentation model; extract a two-dimensional bounding box for the unknown object; retrieve a set of data points received from a LiDAR sensor of the autonomous vehicle monitoring the environment of the autonomous vehicle; identify a first subset of the set of data points corresponding to foreground data points and a second subset of the set of data points corresponding to background data points; and generate, using the mask image and the first subset of the set of data points, a three-dimensional bounding box for the unknown object.

In another aspect, the present disclosure describes a non-transitory computer readable medium that can include one or more instructions stored thereon that are executable by a processor to receive, from a sensor of an autonomous vehicle, an image of an environment outside of the autonomous vehicle; identify a mask image for a road surface and an unknown object using a panoptic segmentation model; extract a two-dimensional bounding box for the unknown object; retrieve a set of data points received from a LiDAR sensor of the autonomous vehicle monitoring the environment of the autonomous vehicle; identify a first subset of the set of data points corresponding to foreground data points and a second subset of the set of data points corresponding to background data points; and generate, using the mask image and the first subset of the set of data points, a three-dimensional bounding box for the unknown object.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting and it may be readily understood that certain aspects of the disclosed systems and methods can be variously arranged and combined, all of which arrangements and combinations are contemplated by this disclosure.

Figure 1:
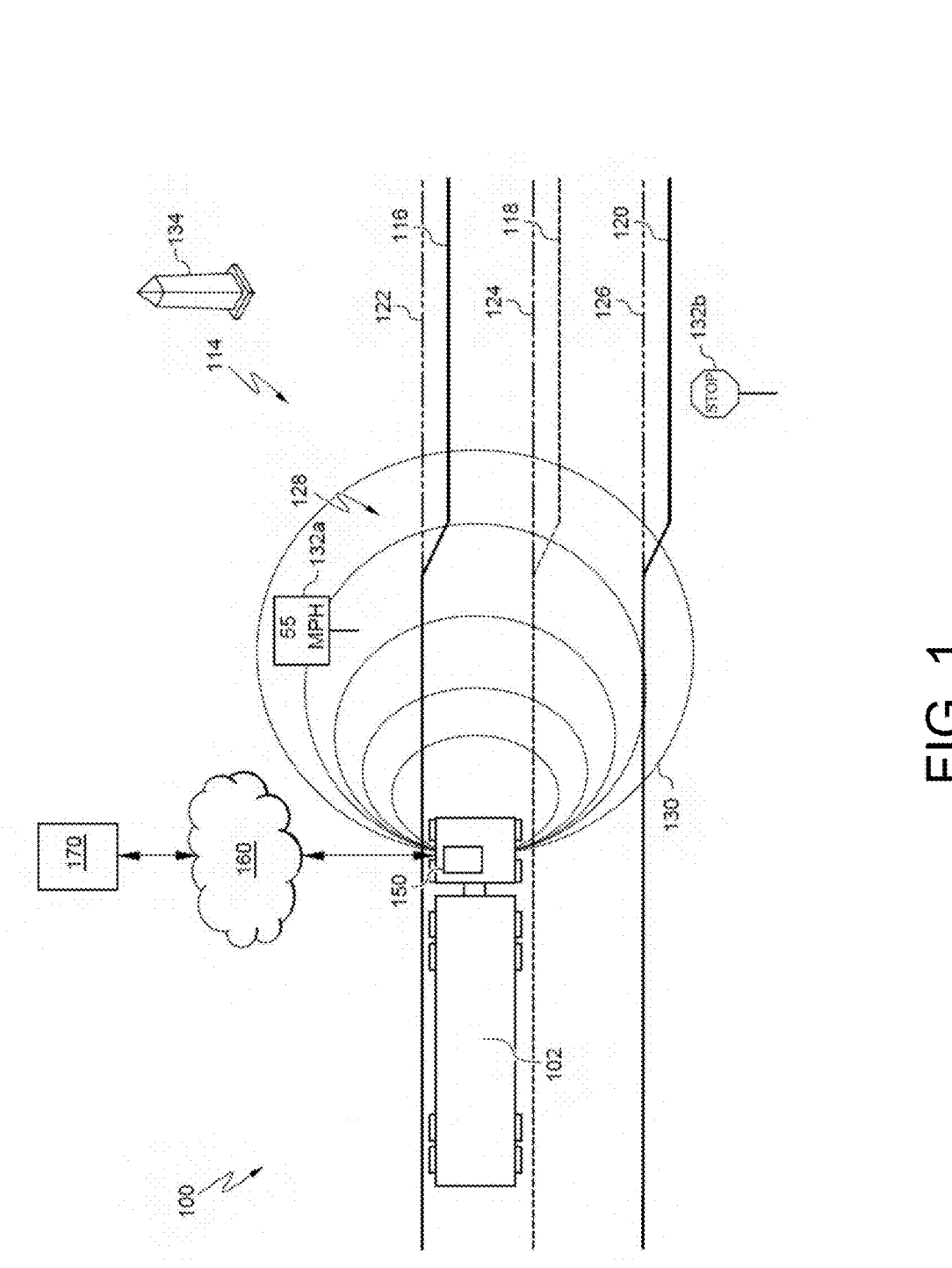
FIG. 1 is a bird's-eye view of a roadway including a schematic representation of a vehicle and aspects of an autonomy system of the vehicle, according to an embodiment.

Referring to FIG. 1, the present disclosure relates to autonomous vehicles, such as an autonomous truck 102 having an autonomy system 150. The autonomy system 150 of truck 102 may be completely autonomous (fully-autonomous), such as self-driving, driverless, or Level 4 autonomy, or semi-autonomous, such as Level 3 autonomy. As used herein the term "autonomous" includes both fully-autonomous and semi-autonomous. The present disclosure sometimes refers to autonomous vehicles as ego vehicles. The autonomy system 150 may be structured on at least three aspects of technology: (1) perception, (2) maps/localization, and (3) behaviors planning and control. The function of the perception aspect is to sense an environment around truck 102 and interpret it. To interpret the surrounding environment, a perception module or engine in the autonomy system 150 of the truck 102 may identify and classify objects or groups of objects in the environment. For example, a perception module associated with various sensors (e.g., LiDAR, camera, radar, etc.) of the autonomy system 150 may identify one or more objects (e.g., pedestrians, vehicles, debris, etc.) and features of the roadway (e.g., lane lines) around truck 102, and classify the objects in the road distinctly.

The maps/localization aspect of the autonomy system 150 may be configured to determine where on a pre-established digital map the truck 102 is currently located. One way to do this is to sense the environment surrounding the truck 102 and to correlate features of the sensed environment with details (e.g., digital representations of the features of the sensed environment) on the digital map.

Once the systems on the truck 102 have determined its location with respect to the digital map features (e.g., location on the roadway, upcoming intersections, road signs, etc.), the truck 102 can plan and execute maneuvers and/or routes with respect to the features of the digital map. The behaviors, planning, and control aspects of the autonomy system 150 may be configured to make decisions about how the truck 102 should move through the environment to get to its goal or destination. It may consume information from the perception and maps/localization modules to know where it is relative to the surrounding environment and what other objects and traffic actors are doing.

FIG. 1 further illustrates an environment 100 for modifying one or more actions of truck 102 using the autonomy system 150. The truck 102 is capable of communicatively coupling to a remote server 170 via a network 160. The truck 102 may not necessarily connect with the network 160 or server 170 while it is in operation (e.g., driving down the roadway). That is, the server 170 may be remote from the vehicle, and the truck 102 may deploy with all the necessary perception, localization, and vehicle control software and data necessary to complete its mission fully-autonomously or semi-autonomously.

While this disclosure refers to a truck (e.g., a tractor trailer) 102 as the autonomous vehicle, it is understood that the truck 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Figure 2:
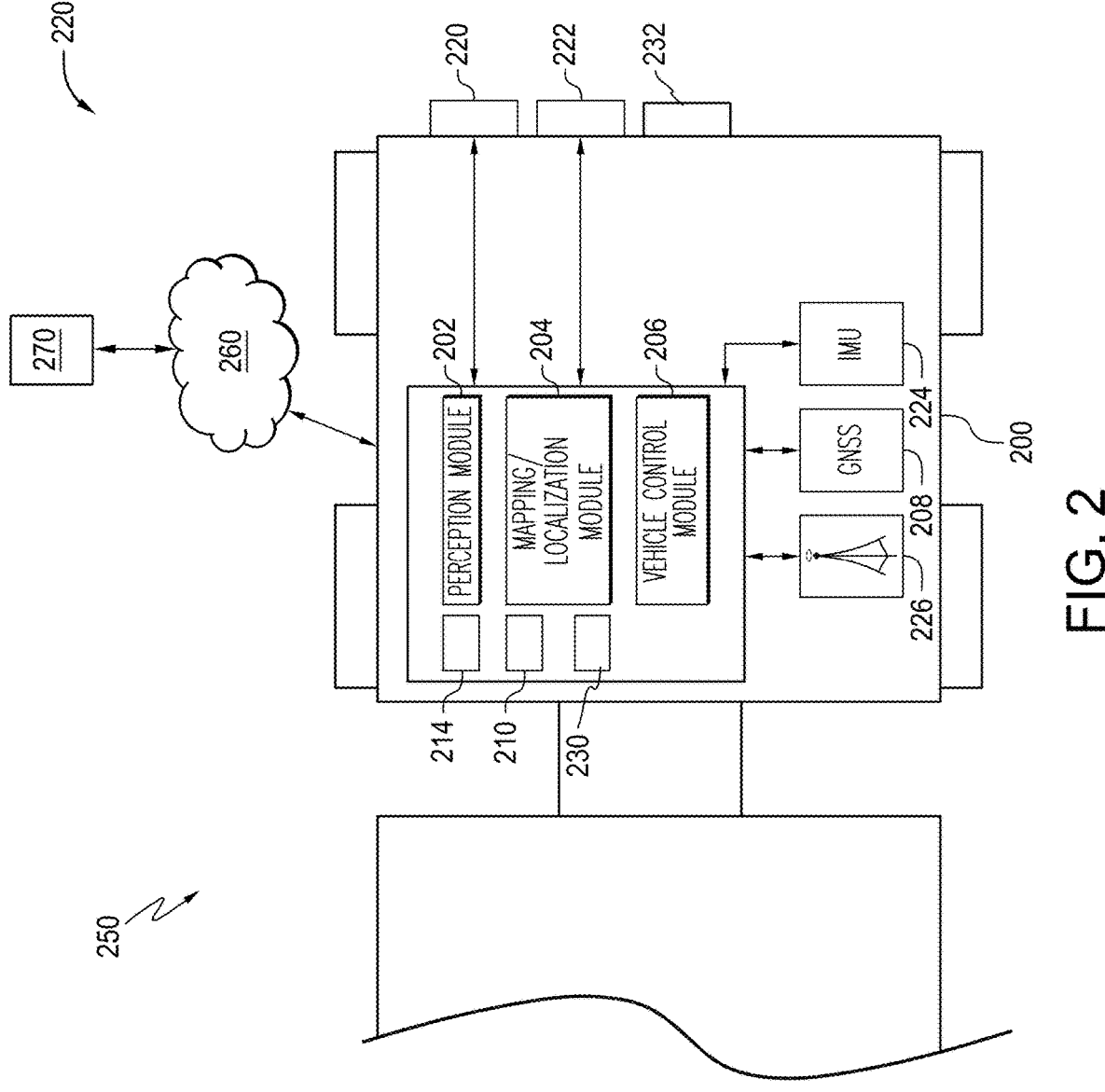
FIG. 2 is a schematic of an autonomy system of a vehicle, according to an embodiment.

With reference to FIG. 2, an autonomy system 250 may include a perception system including a camera system 220, a LiDAR system 222, a radar system 232, a GNSS receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include more, fewer, or different components or systems, and each of the components or system(s) may include more, fewer, or different components. Additionally, the systems and components shown may be combined or divided in various ways. As show in FIG. 1, the perception systems aboard the autonomous vehicle may help the truck 102 perceive its environment out to a perception radius 130. The actions of the truck 102 may depend on the extent of perception radius 130.

The camera system 220 of the perception system may include one or more cameras mounted at any location on the truck 102, which may be configured to capture images of the environment surrounding the truck 102 in any aspect or field-of-view (FOV). The FOV can have any angle or aspect such that images of the areas ahead of, to the side, and behind the truck 102 may be captured. In some embodiments, the FOV may be limited to particular areas around the truck 102 (e.g., forward of the truck 102) or may surround 360 degrees of the truck 102. In some embodiments, the image data generated by the camera system(s) 220 may be sent to the perception module 202 and stored, for example, in memory 214.

The LiDAR system 222 may include a laser generator and a detector and can send and receive a LiDAR signals. The LiDAR signal can be emitted to and received from any direction such that LiDAR point clouds (or "LiDAR images") of the areas ahead of, to the side, and behind the truck 200 can be captured and stored as LiDAR point clouds. In some embodiments, the truck 200 may include multiple LiDAR systems and point cloud data from the multiple systems may be stitched together. In some embodiments, the system inputs from the camera system 220 and the LiDAR system 222 may be fused (e.g., in the perception module 202). The LiDAR system 222 may include one or more actuators to modify a position and/or orientation of the LiDAR system 222 or components thereof. The LIDAR system 222 may be configured to use ultraviolet (UV), visible, or infrared (IR) light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the truck 200 (or object(s) therein). In some embodiments, the point cloud may be rendered as one or more polygon(s) or mesh model (s) through, for example, surface reconstruction. Collectively, the LiDAR system 222 and the camera system 220 may be referred to herein as "imaging systems."

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor processes received reflected data (e.g., raw radar sensor data).

The GNSS receiver 208 may be positioned on the truck 200 and may be configured to determine a location of the truck 200 via GNSS data, as described herein. The GNSS receiver 208 may be configured to receive one or more signals from a global navigation satellite system (GNSS) (e.g., GPS system) to localize the truck 200 via geolocation. The GNSS receiver 208 may provide an input to and otherwise communicate with mapping/localization module 204 to, for example, provide location data for use with one or more digital maps, such as an HD map (e.g., in a vector layer, in a raster layer, or other semantic map, etc.). In some embodiments, the GNSS receiver 208 may be configured to receive updates from an external network.

The IMU 224 may be an electronic device that measures and reports one or more features regarding the motion of the truck 200. For example, the IMU 224 may measure a velocity, acceleration, angular rate, and or an orientation of the truck 200 or one or more of its individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204, to help determine a real-time location of the truck 200, and predict a location of the truck 200 even when the GNSS receiver 208 cannot receive satellite signals.

The transceiver 226 may be configured to communicate with one or more external networks 260 via, for example, a wired or wireless connection in order to send and receive information (e.g., to a remote server 270). The wireless connection may be a wireless communication signal (e.g., Wi-Fi, cellular, LTE, 5G, etc.) In some embodiments, the transceiver 226 may be configured to communicate with external network(s) via a wired connection, such as, for example, during initial installation, testing, or service of the autonomy system 250 of the truck 200. A wired/wireless connection may be used to download and install various lines of code in the form of digital files (e.g., HD digital maps), executable programs (e.g., navigation programs), and other computer-readable code that may be used by the autonomy system 250 to navigate or otherwise operate the truck 200, either fully-autonomously or semi-autonomously. The digital files, executable programs, and other computer readable code may be stored locally or remotely and may be routinely updated (e.g., automatically or manually) via the transceiver 226 or updated on demand. In some embodiments, the truck 200 may not be in constant communication with the network 260 and updates which would otherwise be sent from the network 260 to the truck 200 may be stored at the network 260 until such time as the network connection is restored. In some embodiments, the truck 200 may deploy with all of the data and software it needs to complete a mission (e.g., necessary perception, localization, and mission planning data) and may not utilize any connection to network 260 during some or the entire mission. Additionally, the truck 200 may send updates to the network 260 (e.g., regarding unknown or newly detected features in the environment as detected by perception systems) using the transceiver 226. For example, when the truck 200 detects differences in the perceived environment with the features on a digital map, the truck 200 may update the network 260 with information, as described in greater detail herein.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. Autonomy system 250 may include a single microprocessor or multiple microprocessors that may include means for identifying and reacting to differences between features in the perceived environment and features of the maps stored on the truck 260. Numerous commercially available microprocessors can be configured to perform the functions of the autonomy system 250. It should be appreciated that autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote of truck 260. Various other known circuits may be associated with the autonomy system 250, including signal-conditioning circuitry, communication circuitry, actuation circuitry, and other appropriate circuitry.

Figure 5:
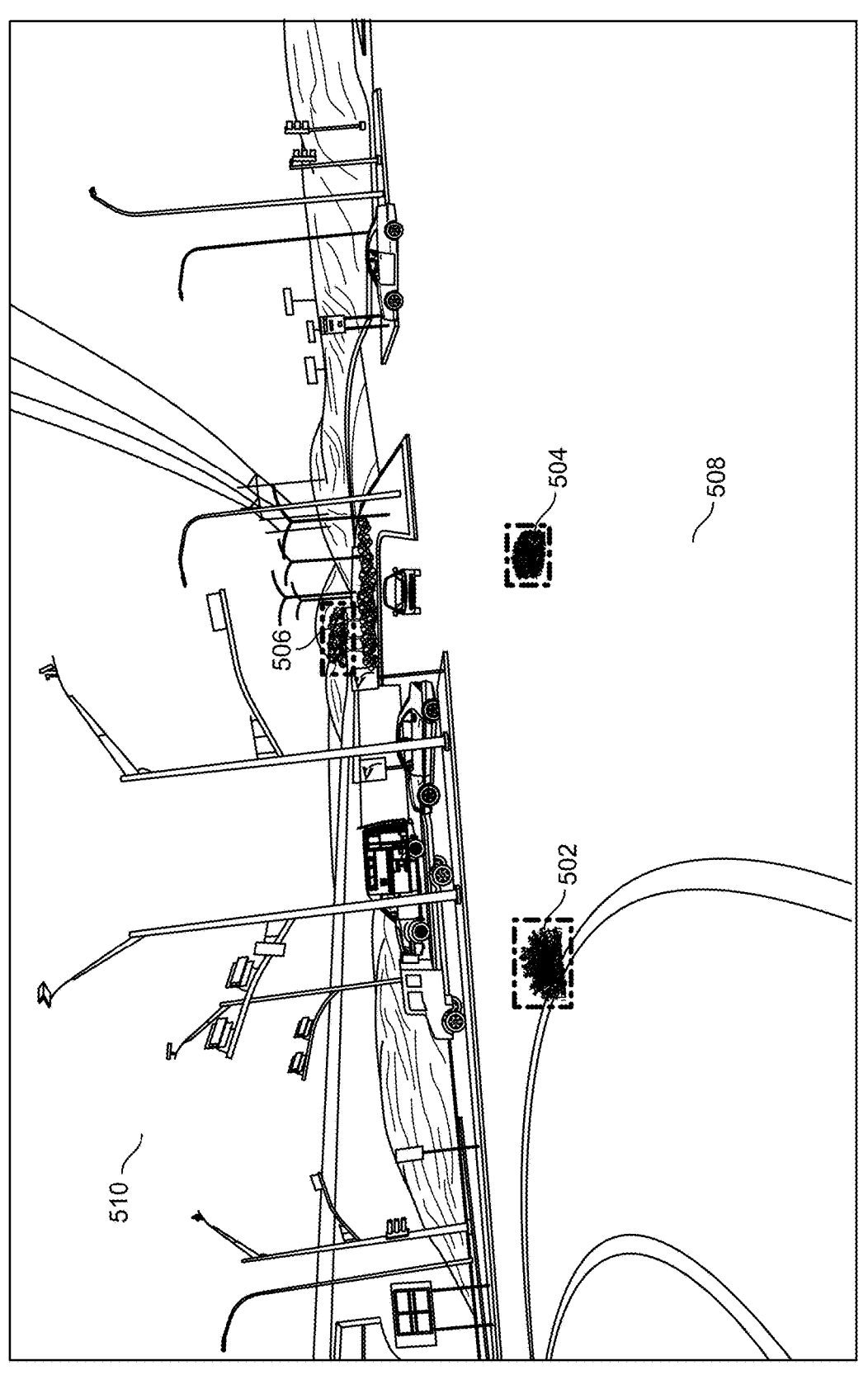
FIG. 5 is an image of an environment from the point of view of an autonomous vehicle that supports detecting unknown objects on a road surface by the autonomous vehicle, according to an embodiment.
Figure 6:
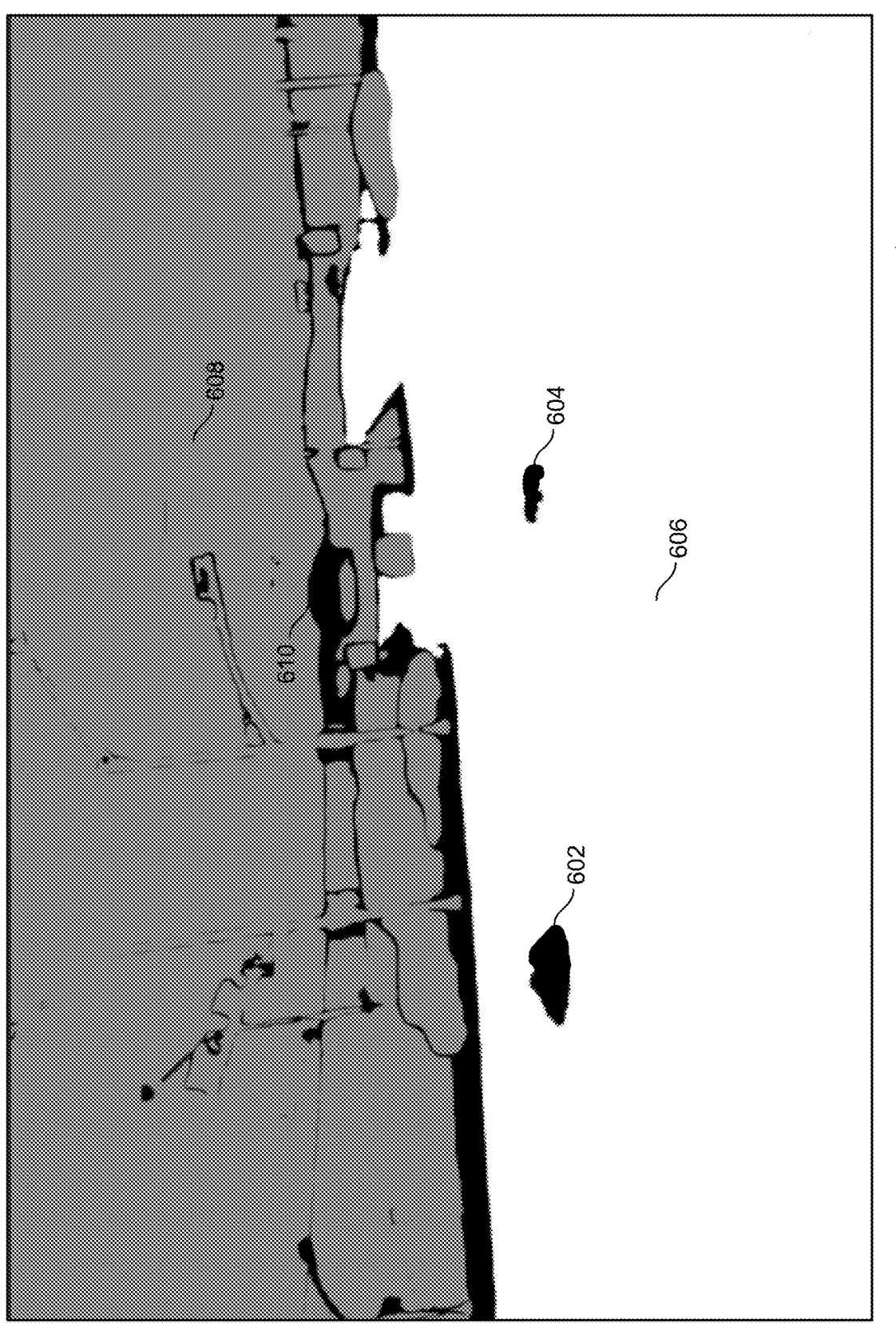
FIG. 6 is a mask image of a roadway from the point of view of an autonomous vehicle that supports detecting unknown objects on a road surface by the autonomous vehicle, according to an embodiment.

The memory 214 of autonomy system 250 may store data and/or software routines that may assist the autonomy system 250 in performing its functions, such as the functions of the perception module 202, the mapping/localization module 204, the vehicle control module 206, a collision analysis module 230, the method 500 described herein with respect to FIG. 5, and the method 600 described herein with respect to FIG. 6. Further, the memory 214 may also store data received from various inputs associated with the autonomy system 250, such as data from the perception system.

As noted above, perception module 202 may receive input from the various sensors, such as camera system 220, LiDAR system 222, GNSS receiver 208, and/or IMU 224 (collectively "perception data") to sense an environment surrounding the truck 260 and interpret it. To interpret the surrounding environment, the perception module 202 (or "perception engine") may identify and classify objects or groups of objects in the environment. For example, the truck 102 may use the perception module 202 to identify one or more objects (e.g., pedestrians, vehicles, debris, etc.) or features of the roadway 114 (e.g., intersections, road signs, lane lines, etc.) before or beside a vehicle and classify the objects in the road. In some embodiments, the perception module 202 may include an image classification function and/or a computer vision function.

The system 100 may collect perception data. The perception data may represent the perceived environment outside of the vehicle, for example, and may be collected using aspects of the perception system described herein. The perception data can come from, for example, one or more of the LiDAR system, the camera system, and various other externally-facing sensors and systems on board the vehicle (e.g., the GNSS receiver, etc.). For example, on vehicles having a sonar or radar system, the sonar and/or radar systems may collect perception data. As the truck 102 travels along the roadway 114, the system 100 may continually receive data from the various systems on the truck 102. In some embodiments, the system 100 may receive data periodically and/or continuously. With respect to FIG. 1, the truck 102 may collect perception data that indicates presence of the lane lines 116, 118, 120. Features perceived by the vehicle should generally track with one or more features stored in a digital map (e.g., in the mapping/localization module 204). Indeed, with respect to FIG. 1, the lane lines 116, 118, 120 that are detected before the truck 102 is capable of detecting the bend 128 in the road (that is, the lane lines that are detected and correlated with a known, mapped feature) will generally match with features in stored map and the vehicle will continue to operate in a normal fashion (e.g., driving forward in the left lane of the roadway or per other local road rules). However, in the depicted scenario the vehicle approaches a new bend 128 in the road that is not stored in any of the digital maps onboard the truck 102 because the lane lines 116, 118, 120 have shifted right from their original positions 122, 124, 126.

The system 100 may compare the collected perception data with stored data. For example, the system may identify and classify various features detected in the collected perception data from the environment with the features stored in a digital map. For example, the detection systems may detect the lane lines 116, 118, 120 and may compare the detected lane lines with lane lines stored in a digital map. Additionally, the detection systems could detect the road signs 132a, 132b and the landmark 134 to compare such features with features in a digital map. The features may be stored as points (e.g., signs, small landmarks, etc.), lines (e.g., lane lines, road edges, etc.), or polygons (e.g., lakes, large landmarks, etc.) and may have various properties (e.g., style, visible range, refresh rate, etc.) that may control how the system 100 interacts with the various features. Based on the comparison of the detected features with the features stored in the digital map(s), the system may generate a confidence level, which may represent a confidence of the vehicle in its location with respect to the features on a digital map and hence, its actual location.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the truck 200 (e.g., lane lines). The computer vision function may use, for example, an object recognition algorithm, video tracing, one or more photogrammetric range imaging techniques (e.g., a structure from motion (SfM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of its motion, size, etc.)

Mapping/localization module 204 receives perception data that can be compared to one or more digital maps stored in the mapping/localization module 204 to determine where the truck 200 is in the world and/or or where the truck 200 is on the digital map(s). In particular, the mapping/localization module 204 may receive perception data from the perception module 202 and/or from the various sensors sensing the environment surrounding the truck 200, and may correlate features of the sensed environment with details (e.g., digital representations of the features of the sensed environment) on the one or more digital maps. The digital map may have various levels of detail and can be, for example, a raster map, a vector map, etc. The digital maps may be stored locally on the truck 200 and/or stored and accessed remotely. In at least one embodiment, the truck 200 deploys with sufficiently stored information in one or more digital map files to complete a mission without connection to an external network during the mission. A centralized mapping system may be accessible via network 260 for updating the digital map(s) of the mapping/localization module 204. The digital map may be built through repeated observations of the operating environment using the truck 200 and/or trucks or other vehicles with similar functionality. For instance, the truck 200, a specialized mapping vehicle, a standard autonomous vehicle, or another vehicle, can run a route several times and collect the location of all targeted map features relative to the position of the vehicle conducting the map generation and correlation. These repeated observations can be averaged together in a known way to produce a highly accurate, high-fidelity digital map. This generated digital map can be provided to each vehicle (e.g., from the network 260 to the truck 200) before the vehicle departs on its mission so it can carry it onboard and use it within its mapping/localization module 204. Hence, the truck 200 and other vehicles (e.g., a fleet of trucks similar to the truck 200) can generate, maintain (e.g., update), and use their own generated maps when conducting a mission.

The generated digital map may include an assigned confidence score assigned to all or some of the individual digital feature representing a feature in the real world. The confidence score may be meant to express the level of confidence that the position of the element reflects the real-time position of that element in the current physical environment. Upon map creation, after appropriate verification of the map (e.g., running a similar route multiple times such that a given feature is detected, classified, and localized multiple times), the confidence score of each element will be very high, possibly the highest possible score within permissible bounds.

The vehicle control module 206 may control the behavior and maneuvers of the truck 200. For example, once the systems on the truck 200 have determined its location with respect to map features (e.g., intersections, road signs, lane lines, etc.) the truck 200 may use the vehicle control module 206 and its associated systems to plan and execute maneuvers and/or routes with respect to the features of the environment. The vehicle control module 206 may make decisions about how the truck 200 will move through the environment to get to its goal or destination as it completes its mission. The vehicle control module 206 may consume information from the perception module 202 and the maps/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the truck 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the truck 200. The steering system may be any combination of mechanisms configured to adjust the heading or direction of the truck 200. The brake system may be, for example, any combination of mechanisms configured to decelerate the truck 200 (e.g., friction braking system, regenerative braking system, etc.) The vehicle control module 206 may be configured to avoid obstacles in the environment surrounding the truck 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller and for vehicle lateral motion control and a propulsion and braking controller for vehicle longitudinal motion.

In disclosed embodiments of a system for detecting unknown objects on a road surface by an autonomous vehicle, the system 100, 250 collects perception data on objects that are unidentified. Such objects are sometimes referred to herein as unknown objects. Collected perception data on unknown objects may be used in collision and navigational analysis.

In an embodiment, object detection module 230 executes an object detection procedure to detect unknown objects. For example, the object detection module 230 can communicate with the camera system 220 to obtain an image (e.g., image data) of a surrounding of the truck 200 from a sensor (e.g., a camera) of the truck 200. The object detection module 230 can identify a mask for the image. The mask may include multiple categories (e.g., road surface, potential unknown objects, the rest of the image). Based on the mask, the object detection module 230 can generate (e.g., extract) a 2D bounding box for the unknown objects. The object detection module 230 can communicate with the LiDAR system 222 to obtain a set of data points of the environment, the set received from a LiDAR sensor of the truck 200. The object detection module 230 can compare the set of data points to the masked image to generate a subset of the data points. The subset may include the data points that belong to the road surface or that are within the 2D bounding box. The object detection module 230 can further refine the subset of data points into foreground and background data points. Based on the determination of the foreground data points, the object detection module 230 can generate a 3D bounding box and detect one or more unknown objects in the environment of the truck 200.

Figure 3:
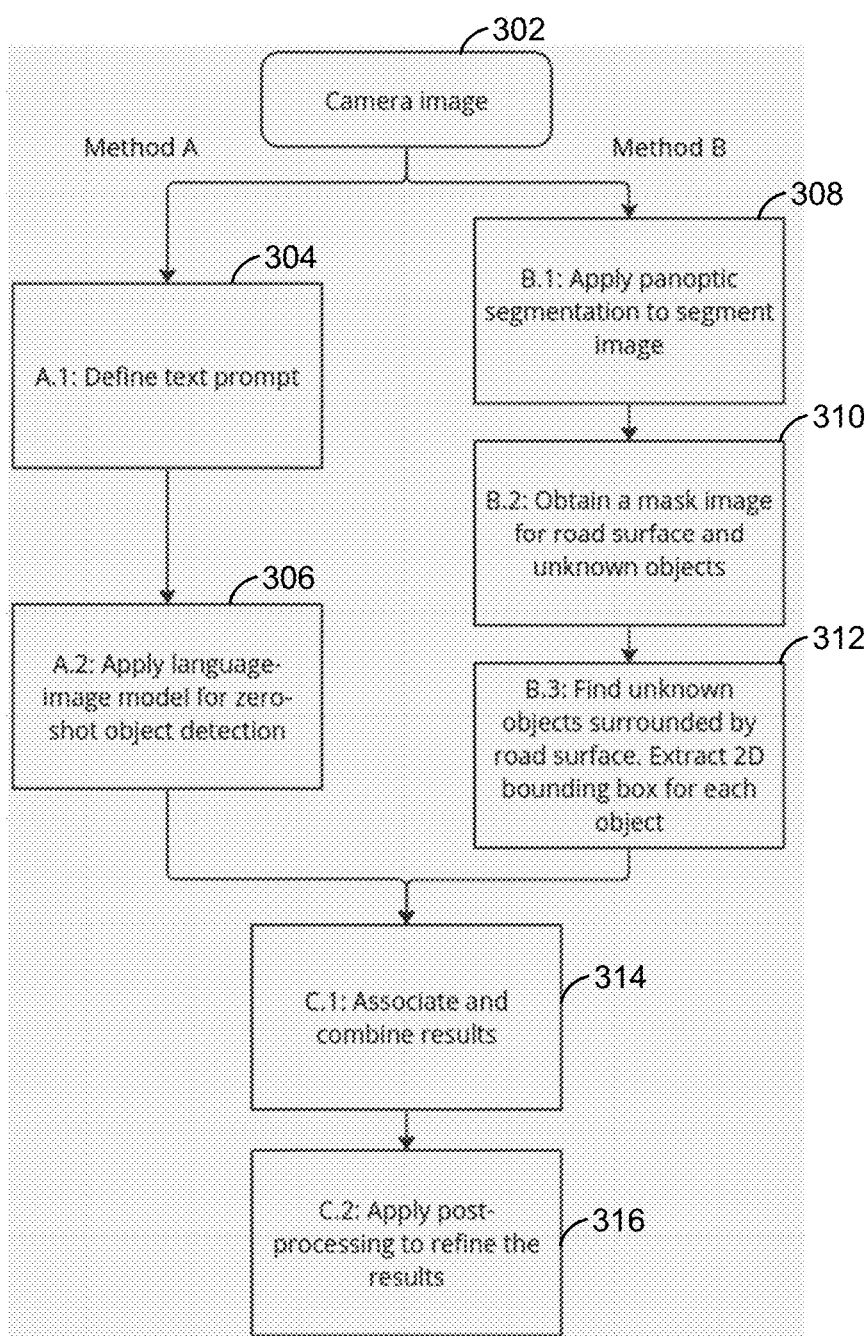
FIGS. 3-4 are flow diagrams that support detecting unknown objects on a road surface by an autonomous vehicle, according to an embodiment.

FIG. 3 is an illustration of a flow diagram 300 that supports detecting unknown objects on a road surface by an autonomous vehicle, according to an embodiment. The flow diagram 300 can include one or more image processing techniques (e.g., methods). The flow diagram 300 comprises execution steps 302-316, however, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously. The flow diagram 300 is described as being performed by a data processing system stored on or otherwise located at an autonomous vehicle, such as the trucks 102 and 200 depicted in FIGS. 1-2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At step 302, the data processing system can obtain an image (e.g., a camera image, image data). For example, an autonomous vehicle may be driving along a roadway while on a route to a destination. The autonomous vehicle may use one or more cameras or other sensors to capture images of a surrounding environment around the autonomous vehicle. The images may include multiple FOVs such that the roadway, the sky, and other environs—including other vehicles, road signs, structures, foliage, objects, and other elements in the landscape—are captured in the images.

At step 304, the data processing system can perform a first method for processing the image, as described herein with reference to FIG. 5. The first method may include the data processing system defining text prompts for one or more machine learning models. In some embodiments, the machine learning models may be language and/or image based models that can take the image and the text prompts as input and will search for matching elements within the image corresponding to the configured text prompts. For example, the data processing system may give a text prompt of "tumbleweed" to the machine learning model along with the image. The machine learning model may identify all instances of tumbleweeds within the image and provide indications of the findings as output. In some cases, the data processing system may apply a zero-shot object detection technique when applying the machine learning models (e.g., object detection without training or with little training based on free text queries). At step 306, the data processing system can apply the machine learning models to the image.

Figure 7:
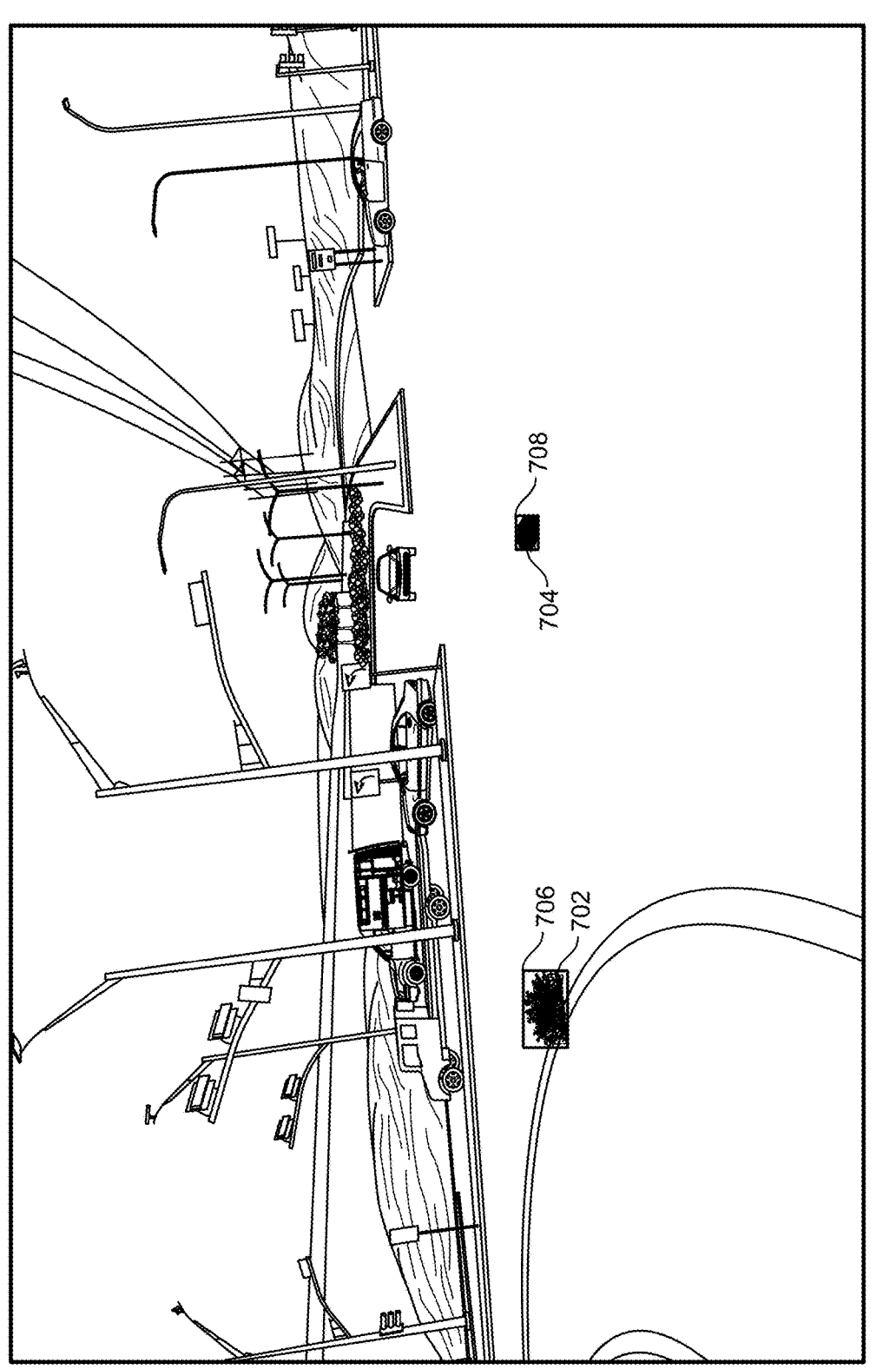
FIG. 7 is an image of an environment from the point of view of an autonomous vehicle that supports detecting unknown objects on a road surface by the autonomous vehicle, according to an embodiment.

At step 308, the data processing system can perform a second method for processing the image, as described herein with reference to FIGS. 6-7. The second method may include the data processing system can apply one or more segmentation techniques to segment the image. In some embodiments, the data processing system may classify pixels of the image with a class label and with an instance identifier (e.g., panoptic segmentation). For example, the class labels may be "roadway", "tumbleweed", and "other". If the image includes more than one tumbleweed, each tumbleweed could be identified with an enumeration (e.g., [tumbleweed, 0] and [tumbleweed, 1]). Other labels, identifiers, and segmentation techniques (e.g., instance segmentation, semantic segmentation) can also be used to segment the image.

At step 310, the data processing system can obtain a mask image based on the image and the segmentation technique, as described herein with reference to FIG. 6. For example, the segmentation technique may include generating one or more masks (e.g., a binary mask, a 2D array of true or false for each pixel of the image) for the image. Based on the masks, the data processing system can generate the masked image by determining which class labels (e.g., classes) to keep. For example, the segmentation technique may generate multiple class labels. The data processing system can identify classes corresponding to road surface, unknown objects (e.g., potentially unknown objects), and other (e.g., the rest). The data processing system can get rid of all masks related to other class labels.

At step 312, the data processing system can determine unknown objects, as described herein with reference to FIG. 7. For example, the data processing system can determine which pixels (e.g., data points, objects) are surrounded by road surface pixels (e.g., data points corresponding to a road surface mask). In some implementations, the data processing system may determine objects that satisfy a threshold (e.g., are completely enclosed by the road surface, are sufficiently enclosed by the road surface) percentage of pixels are unknown objects on the roadway. The data processing system can extract a 2D bounding box for each unknown object detected on the roadway.

At step 314, the data processing system can associate the results from the first method and the results from the second method and combine the two results. To support the reduction of potential false positive detections, at step 316, the data processing system can apply one or more post-processing techniques to the combined results to refine the results and attempt to catch errors (e.g., objects not on the roadway).

Figure 4:
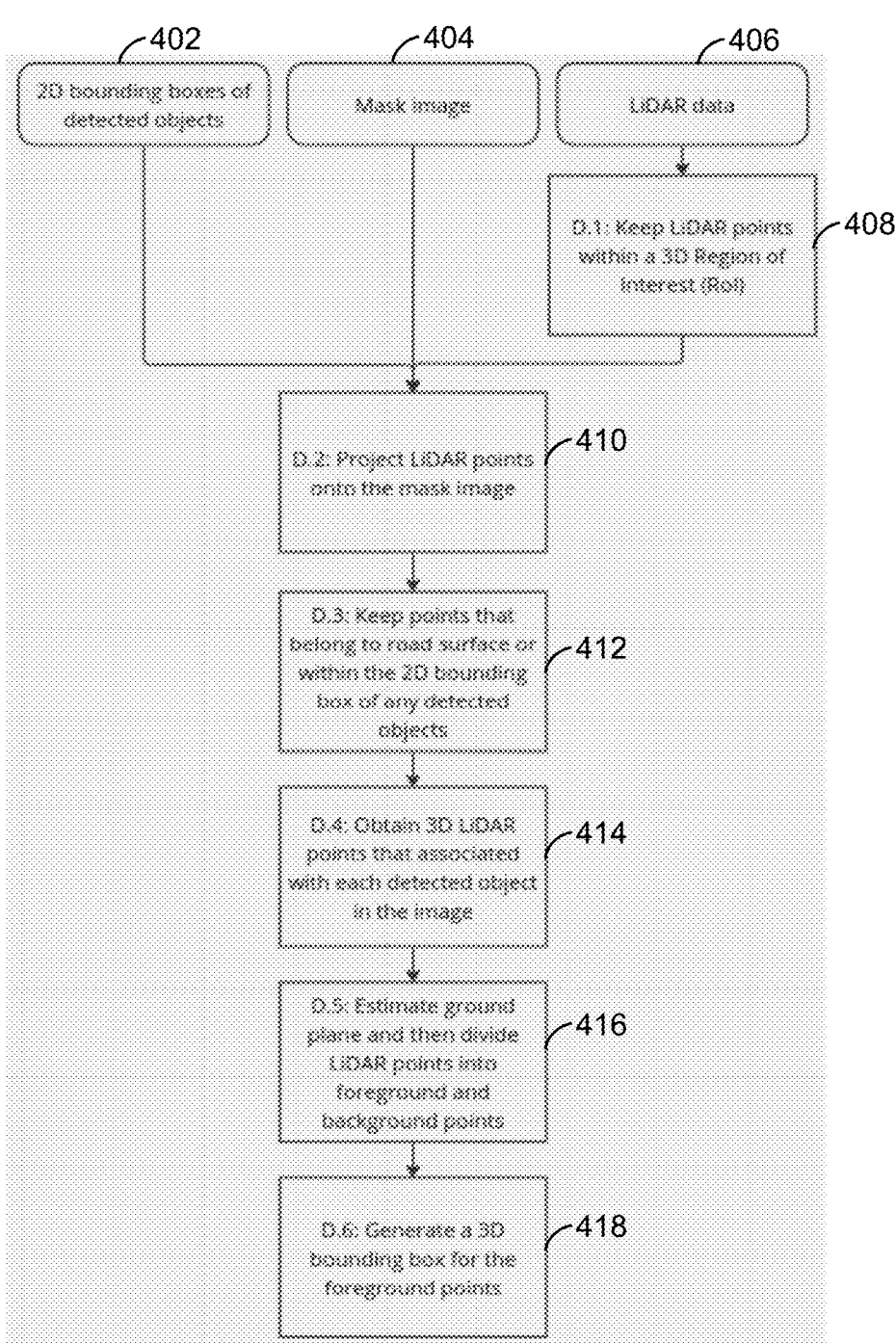

FIG. 4 is an illustration of a flow diagram 400 that supports detecting unknown objects on a road surface by an autonomous vehicle, according to an embodiment. The flow diagram 400 can include one or more outputs of the flow diagram 300 as inputs. The flow diagram 400 comprises execution steps 402-418, however, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously. The flow diagram 400 is described as being performed by a data processing system stored on or otherwise located at an autonomous vehicle, such as the trucks 102 and 200 depicted in FIGS. 1-2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At step 406, the data processing system can obtain LiDAR data (e.g., a set of data points, a LiDAR point cloud, a LiDAR image). For example, an autonomous vehicle may be driving along a roadway while on a route to a destination. The autonomous vehicle may use one or more LiDAR sensors to scan a surrounding environment around the autonomous vehicle. The LiDAR image may include data from multiple directions from the vehicle such that the roadway and other environs—including other vehicles, road signs, structures, foliage, objects, and other elements in the landscape—are captured in the images.

Figure 8:
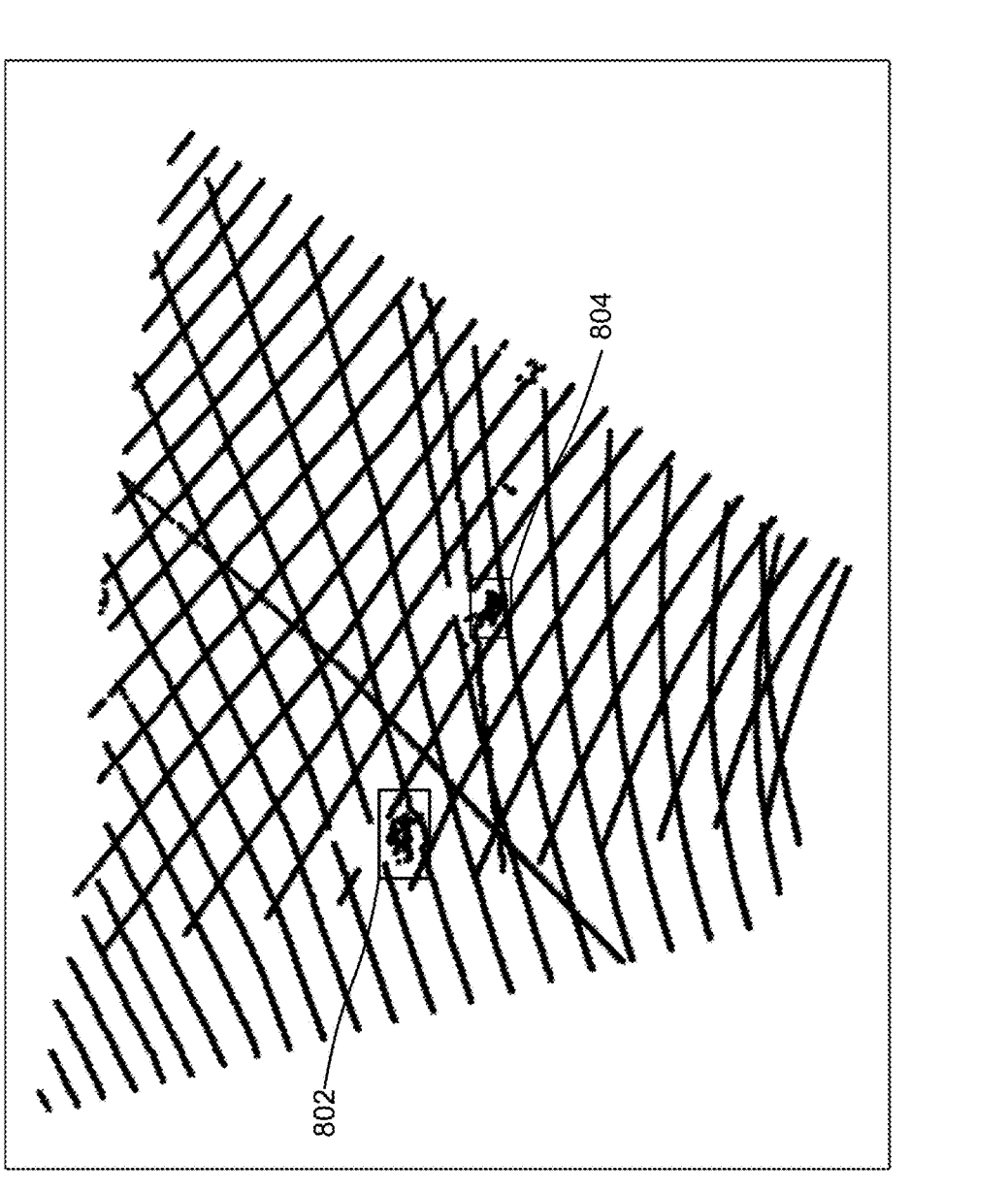
FIGS. 8-10 are illustrations of LiDAR data points of a roadway from the point of view of an autonomous vehicle that supports detecting unknown objects on a road surface by the autonomous vehicle, according to an embodiment.

At step 408, the data processing system can select various LiDAR data points of the set, as described herein with reference to FIG. 8. For example, the data processing system may determine (e.g., define) a 3D ROI. Based on the 3D ROI, the data processing system may determine to keep data points within the ROI and remove (e.g., get rid of, delete)

data points outside of the 3D ROI. In some cases, the data processing system may determine the ROI based on one or more parameters (e.g., a region in front of the autonomous vehicle).

The data processing system can obtain one or more 2D bounding boxes of detected objects (e.g., described at step 312 in FIG. 3) from step 402 and a mask image of the environment (e.g., described at step 310 in FIG. 3) from step 404. At step 410, the data processing system can project the ROI data points onto the mask image (e.g., using one or more calibration parameters). For example, the data processing system can apply various calibration techniques, such as intrinsic and extrinsic calibration of the LiDAR system to the camera system (e.g., by establishing a geometric relationship between coordinate systems of the LiDAR system and the camera system by using one or more calibration objects).

At step 412, the data processing system can select data points of the ROI data points, as described herein with reference to FIG. 8. For example, the data processing system may determine which data points correspond to the roadway and which data points are within the 2D bounding boxes of the image based on the projection of the ROI data points onto the mask image. The data processing system may determine to keep data points within the roadway or the 2D bounding boxes and remove (e.g., get rid of, delete) data points outside of the roadway or the 2D bounding boxes.

Figure 9:
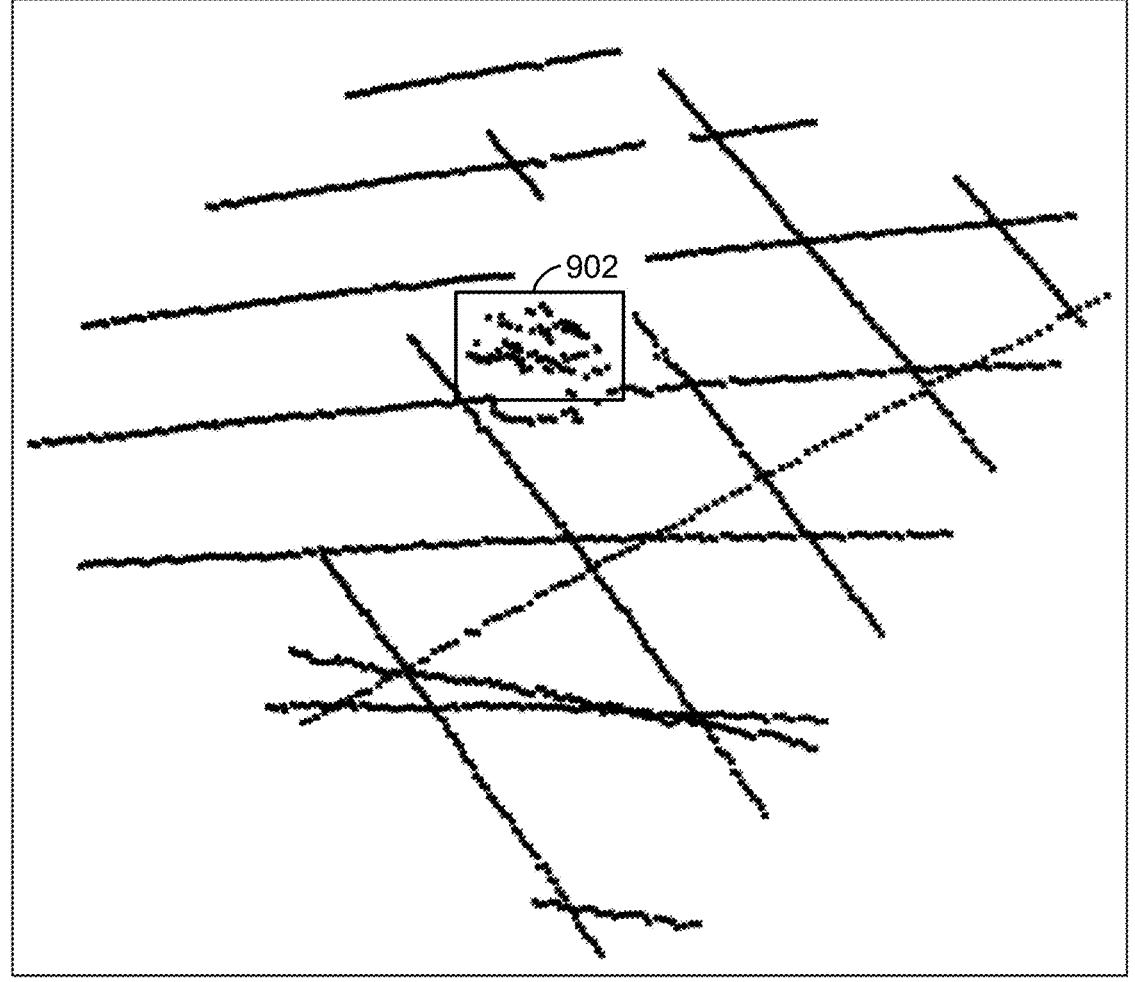

At step 414, the data processing system can obtain data points that are associated with each detected object, as described herein with reference to FIG. 9. For example, for each detected object (e.g., each 2D bounding box), the data processing system can determine a respective set of data points (e.g., 3D LiDAR data points) corresponding to the object. In some cases, the data processing system may include neighboring road surface data points (e.g., 3D LiDAR data points corresponding to the roadway) in a predefined region (e.g., within a defined distance from the object) to the respective sets of data points. For example, the data processing system may include a number of data points to account for a margin of error (e.g., to not exclude potential data points corresponding to the object).

Figure 10:
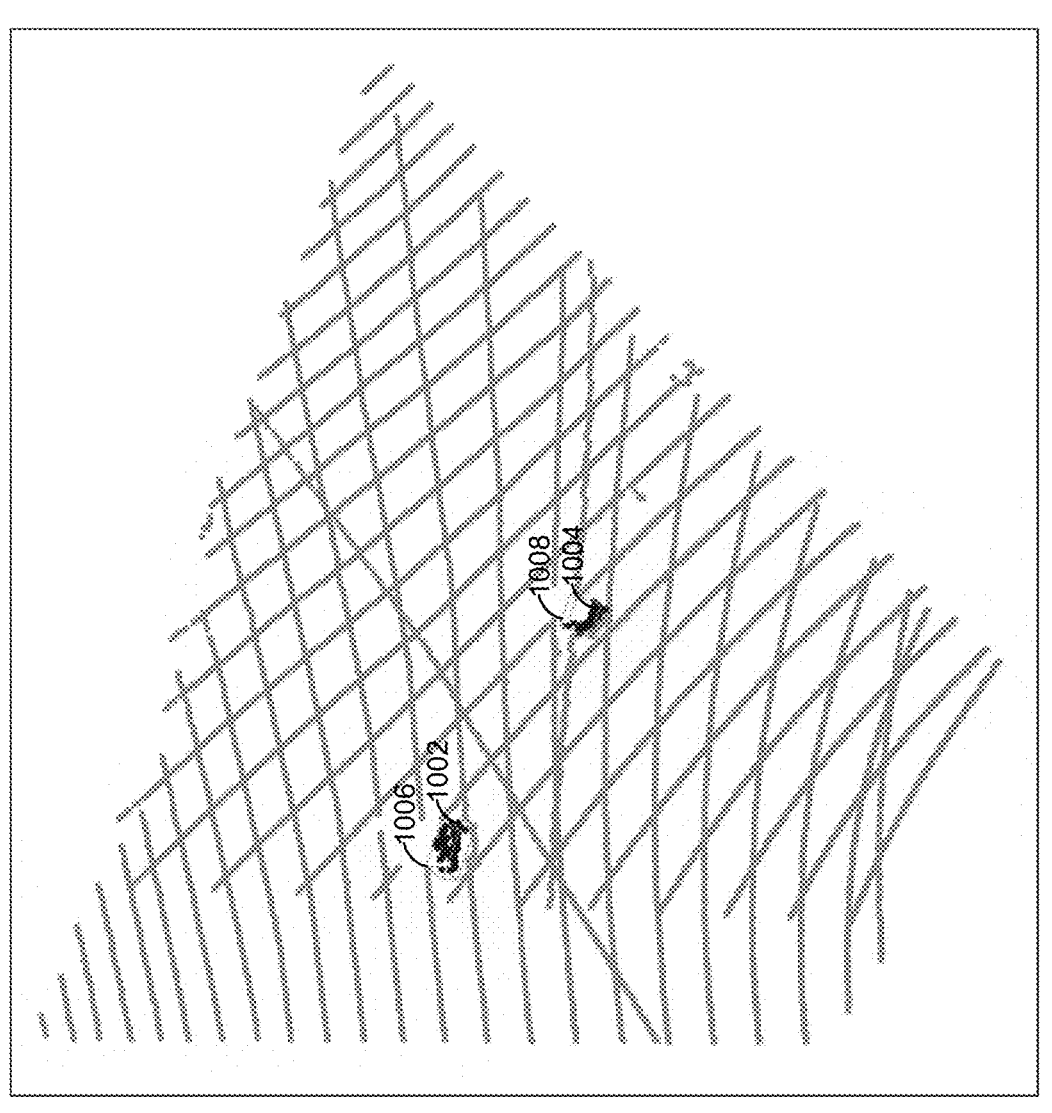

At step 416, the data processing system can estimate a ground plane, as described herein with reference to FIG. 10. For example, the data processing system may use one or more ground plane estimation techniques to estimate which LiDAR data points correspond to the ground plane (e.g., the road surface). Based on the estimation, the data processing system can separate (e.g., divide) each respective set of data points into a first subset of foreground points (e.g., data points corresponding to the object) and a second subset of background points (e.g., data points corresponding to the road surface). In some embodiments, the data processing system may determine whether the first subset includes an amount of data points that satisfy a threshold amount of data points. If the first subset fails to satisfy the threshold, the data processing system may determine that the object (e.g., the 2D bounding box) is a false positive and discard the respective set of data points.

At step 418, the data processing system can generate a 3D bounding box for each respective set, as described herein with reference to FIG. 10. For example, the data processing system may estimate a respective 3D bounding box to fit the first subset of foreground points for each respective set. Based on the 3D bounding boxes, the data processing system can determine a number of unknown objects on the surface of the roadway and determine one or more navigational actions based on the unknown objects. Advantageously, by determining that there are unknown objects on the surface of the road and the location of the unknown objects, other image processing and/or machine learning techniques can be used to determine (e.g., classify) the unknown objects. For example, computational resources required to classify an unknown object may be less than resources required to analysis an image and classify all elements of the image. By classifying the objects, the data processing system can determine if the autonomous vehicle can safely (e.g., without causing harm or damage to the vehicle and other occupants of the roadway) drive over the objects (e.g., road debris) or if the autonomous vehicle should perform one or more navigational actions (e.g., evasive maneuvers, merging into another lane, reducing a speed of the autonomous vehicle, etc.) to safely avoid the objects. This and other advantages are possible by determining if unknown objects are on the surface of the roadway.

FIG. 5 is an image 500 of an environment from the point of view of an autonomous vehicle that supports detecting unknown objects on a road surface by the autonomous vehicle, according to an embodiment. The image 500 can include a roadway 508 and a background 510. The roadway 508 can include a first potential unknown object 502 and a second potential unknown object 504. The background 510 can include a third potential unknown object 506 and other environs (e.g., hills, sky, structures, dirt, signs, etc.). The autonomous vehicle can be the same as or similar to the vehicles 102 and 200. The FIGS. 5-10 include an example scenario for utilizing the systems and methods as described herein. The example given in FIGS. 5-10 is one potential example of utilizing the systems and methods as described herein, other potential scenarios are possible and contemplated.

The autonomous vehicle can drive along the roadway 508. While driving, the autonomous vehicle can obtain (e.g., take, capture, record) the image 500. The image 500 may be an image from the FOV of the front of the autonomous vehicle and may depict an environment in front of the autonomous vehicle. The autonomous vehicle can process the image (e.g., according to steps 304-308 of FIG. 3). For example, the autonomous vehicle may detect the first object 502, the second object 504, and the third object 506 based on a text prompt (e.g., tumbleweed, foliage, shrubs, etc.) as applied to a machine learning model. The autonomous vehicle may detect the first object 502, the second object 504, and the third object 506 based on a segmentation technique that classifies elements of an image and determines instances of each classification. For instance, the first object 502 may be [tumbleweed, 0], the second object 504 may be [tumbleweed, 1], and the third object 506 may be [tumbleweed, 2].

FIG. 6 is a mask image 600 of an environment from the point of view of an autonomous vehicle that supports detecting unknown objects on a road surface by the autonomous vehicle, according to an embodiment. The mask image 600 can include a roadway 606 and a background 608. The roadway 606 can surround a first potential unknown object 602 and a second potential unknown object 604. The background can surround a third potential unknown object 610. The autonomous vehicle can be the same as or similar to the vehicles 102 and 200.

The autonomous vehicle can obtain the mask image 600 based on a segmentation technique (e.g., the segmentation technique performed on image 500). For example, the autonomous vehicle may generate a first mask (e.g., the grey pixels) for the background 608, a second mask (e.g., the white pixels) for the roadway 606, and a third mask (e.g., the black pixels) for other objects (e.g., including the objects 602 and 604). In some embodiments, the autonomous vehicle may generate a 2D array where the 2D array includes a pixel identification (e.g., an enumerated number) and an indication of what class label the pixel is associated with (e.g., [pixel ID, class label]). The autonomous vehicle can generate the mask image 600 and determine which objects are on the roadway 606. For example, the autonomous vehicle may identify the objects 602 and 604 are located on the roadway 606 based on the objects 602 and 604 being surrounded by white pixels (e.g., pixels corresponding to the roadway 606). The autonomous vehicle may determine the object 610 is not located on the roadway 606 based on the object 610 being surrounded by the grey pixels (e.g., pixels corresponding to the background 608) and other black pixels (e.g., pixels corresponding to other objects). In some examples, other objects may be partially surrounded by a combination of different colored pixels (e.g., white, black, and grey). In some cases, the autonomous vehicle may determine whether the other objects are located on the roadway 606 based on a percentage of the pixels being one or more colors.

FIG. 7 is an image 700 of an environment from the point of view of an autonomous vehicle that supports detecting unknown objects on a road surface by the autonomous vehicle, according to an embodiment. The image 700 can include a roadway with a first potential unknown object 702 and a second potential unknown object 704. The first object 702 can be bounded by a first 2D bounding box 706 and the second object 704 can be bounded by a second 2D bounding box 708. The autonomous vehicle can be the same as or similar to the vehicles 102 and 200.

The autonomous vehicle can extract (e.g., generate, calculate) the 2D bounding boxes 706 and 708 (e.g., according to step 312 of FIG. 3). For example, the extraction may be based on a percentage of the pixels surrounding an object (e.g., pixels classified as an object) being classified as corresponding to the roadway based on a mask image (e.g., the mask image 600). The autonomous vehicle may refrain from extracting 2D bounding boxes for objects that are surrounded by a percentage of pixels that does not satisfy a percentage threshold.

In some cases, the image processing techniques as described in FIGS. 6-7 can produce false positives. For example, a vehicle located on the roadway may include a poster that includes a picture of tumbleweed. Because the vehicle is located on the roadway, the autonomous vehicle may determine that the picture of the tumbleweed is surrounded by a sufficient percentage of roadway pixels and extract a 2D bounding box for the picture of the tumbleweed (e.g., a false positive). The autonomous vehicle can apply one or more post-processing techniques to the image 700 and the extracted 2D bounding boxes. Based on the post-processing techniques, the autonomous vehicle may refine the 2D bounding boxes and potentially detect false positives (e.g., the picture of the tumbleweed).

FIG. 8 is an illustration of LiDAR data points 800 of an environment from the point of view of an autonomous vehicle that supports detecting unknown objects on a road surface by the autonomous vehicle, according to an embodiment. The data points 800 can include a first set of data points 802 corresponding to a first potential unknown object and a second set of data points 804 corresponding to a second potential unknown object. The autonomous vehicle can be the same as or similar to the vehicles 102 and 200.

The autonomous vehicle can obtain (e.g., take, capture, record, scan) LiDAR data points. The data points may be a LiDAR point cloud and may depict the environment surrounding the autonomous vehicle. The autonomous vehicle can process the point cloud (e.g., according to steps 406-412 of FIG. 4). For example, the autonomous vehicle can select the data points 800 from the point cloud (e.g., filter data points from the point cloud) based on a defined ROI. The ROI can include a region in front of the autonomous vehicle.

The autonomous vehicle can project the data points 800 onto an image. For example, the image may be the image 600, 700, or a combination of the two, as described herein with reference to FIGS. 6-7. The image may include various 2D bounding boxes bounding potential unknown objects. The autonomous vehicle can select (e.g., keep) the data points 800 that correspond to the road surface of the image or that correspond to being within the 2D bounding boxes. For example, the first set of data points 802 and the second set of data points 804 may correspond to a first object (e.g., object 702) and a second object (e.g., object 704), respectively.

FIG. 9 is an illustration of LiDAR data points 900 of an environment from the point of view of an autonomous vehicle that supports detecting unknown objects on a road surface by the autonomous vehicle, according to an embodiment. The data points 900 can include a first set of data points 902 corresponding to a first potential unknown object and an amount of surrounding data points. The autonomous vehicle can be the same as or similar to the vehicles 102 and 200.

For each detected object within a LiDAR point cloud (e.g., the data points 800), the autonomous vehicle can select a set of data points. For example, the autonomous vehicle can isolate the data points 902 (e.g., corresponding to the first set of data points 802 and the object 702). In some cases, the data points 902 may include both data points corresponding to pixels associated with an object (e.g., a potentially unknown object) and data points corresponding to pixels associated with a roadway. For example, the data points 902 can include LiDAR data points associated with a detected object and neighboring LiDAR points (e.g., within a defined range of the detected object) within an ROI.

For each set of isolated data points, the autonomous vehicle can estimate a ground plane. For example, the autonomous vehicle can estimate a ground plane for the data points 902. To do so, the autonomous vehicle can use one or more ground plan estimation techniques to estimate which data points of the data points 900 correspond to the ground plan (e.g., the road surface). The autonomous vehicle can divide (e.g., separate) the data points 900 into foreground points (e.g., data points associated with the object, data points above the ground plane) and background points (e.g., data points associated with the surface of the road, data points corresponding to the ground plane). In some cases, if the foreground points fail to satisfy a threshold number of data points, the autonomous vehicle may determine the foreground points to correspond to a false positive (e.g., object 506, a picture of tumbleweed on a vehicle on the roadway) and discard the data points 902.

FIG. 10 is an illustration of LiDAR data points 1000 of an environment from the point of view of an autonomous vehicle that supports detecting unknown objects on a road surface by the autonomous vehicle, according to an embodiment. The data points 1000 can include a first set of data points 1002 corresponding to a first unknown object (e.g., object 702) and a second set of data points 1004 corresponding to a second unknown object (e.g., object 704). The data points 1002 can be bounded by a first 3D bounding box 1006 and the data points 1004 can be bounded by a second 3D bounding box 1008. The autonomous vehicle can be the same as or similar to the vehicles 102 and 200.

The data points 1000 can be separated into a first subset of data points associated with background points (e.g., data points associated with the surface of the road, data points corresponding to the ground plane) and respective subsets of data points (data points 1002 and data points 1004) associated with respective foreground points (e.g., data points associated with the objects 702 and 704, data points above the ground plane). The autonomous vehicle can estimate 3D bounding boxes 1006 and 1008 to fit the respective sets of foreground points. Based on estimating the 3D bounding boxes 1006 and 1008, the autonomous vehicle can detect a location, size, and other properties of unknown objects. Advantageously, by determining there is an unknown object on the roadway and properties about the unknown object, the autonomous vehicle can determine one or more navigational actions to perform (e.g., drive over the object, avoid the object) as well as utilize a decreased amount of resources in determining (e.g., classifying) a type of the unknown objects (e.g., that the unknown objects are tumbleweeds and are safe to drive over).

Figure 11:
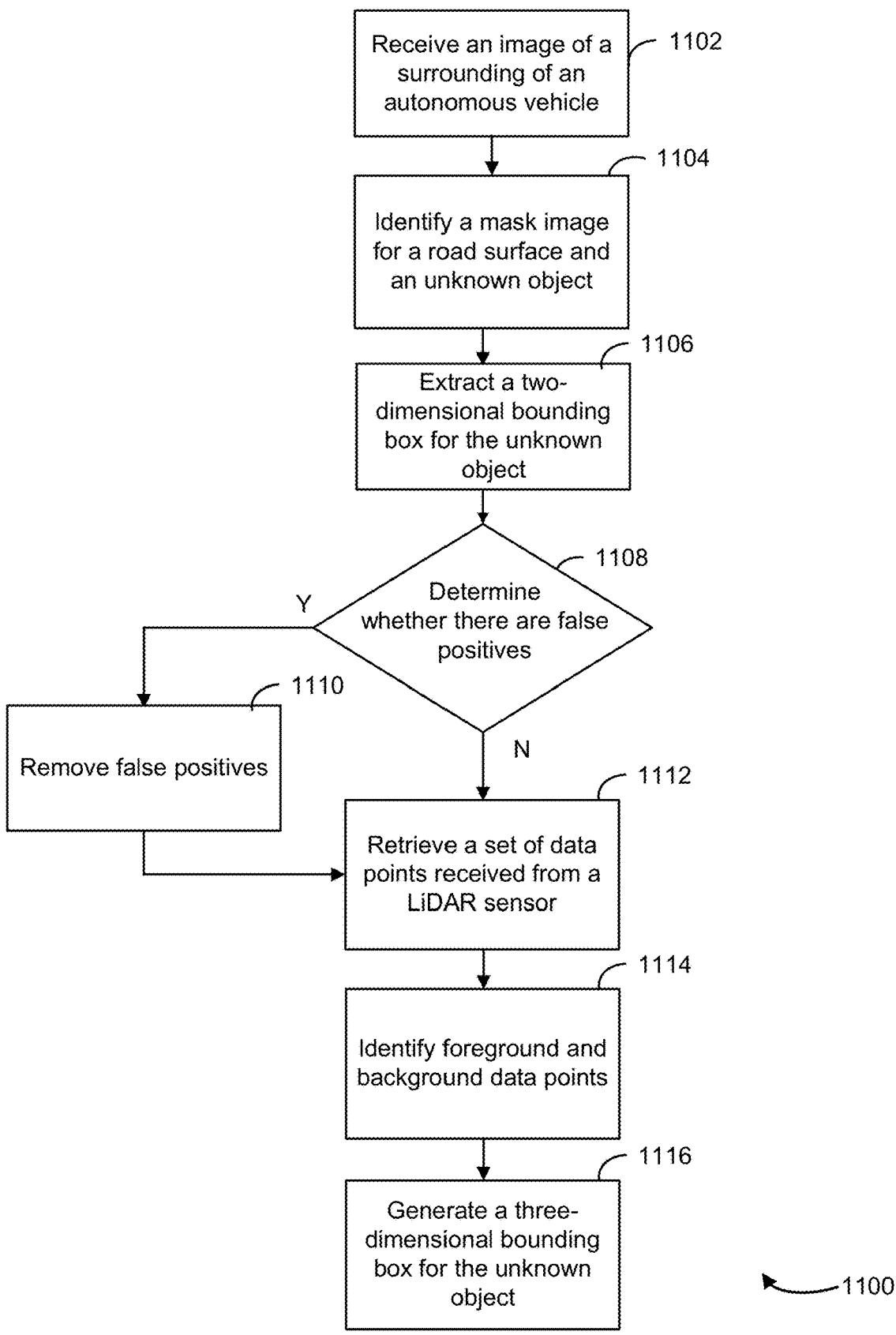
FIG. 11 is a method for detecting unknown objects on a road surface by an autonomous vehicle, according to embodiments.

FIG. 11 shows execution steps of a processor-based method using the system 250, according to some embodiments. The method 1100 shown in FIG. 11 comprises execution steps 1102-1116. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously. The method 1100 is described as being performed by a data processing system stored or on or otherwise located at an autonomous vehicle, such as the trucks 102 and 200 depicted in FIGS. 1-2. However, in some embodiments, one or more of the steps may be performed by a different processor, server, or any other computing feature. For instance, one or more of the steps may be performed via a cloud-based service or another processor in communication with the processor of an autonomous vehicle and/or the autonomy system of such an autonomous vehicle.

At 1102, the data processing system receives, from a sensor of an autonomous vehicle, an image of an environment of the autonomous vehicle. For example, the image can be image data obtained from a camera or other perception sensor. At 1104, the data processing system identifies a mask image for a road surface and an unknown object using a panoptic segmentation model. For example, the data processing system can use a panoptic segmentation process to classify pixels within the image and identify various instances of each classification. Based on the classification, the data processing system can generate a binary mask for each class (e.g., background, roadway, objects).

At 1106, the data processing system extracts a 2D bounding box for the unknown object. For example, data processing system can generate the 2D bounding box based on determining which pixels (e.g., object pixels) are surrounded by roadway pixels, and fit the 2D bounding box to the pixels. At 1108, the data processing system determines whether there are false positives. For example, if an object (e.g., pixels corresponding to a potential unknown object) is not surrounded by a threshold number of roadway pixels, the data processing system may determine the object is a false positive. At 1110, the data processing system removes false positives.

At 1112, the data processing system retrieves a set of data points received from a LiDAR sensor of the autonomous vehicle monitoring the environment outside of the autonomous vehicle. For example, the set of data points may be a LiDAR point cloud depicting the environment of the autonomous vehicle. The autonomous vehicle can project the set of data points onto the mask image in a region associated with the unknown object to identify the data points that correspond to the roadway or to the 2D bounding boxes within an ROI. At 1114, the data processing system identifies a first subset of the set of data points corresponding to foreground data points and a second subset of the set of data points corresponding to background data points. To do so, the data processing system can predict a ground plane for the set of data points received from the LiDAR sensor using one or more ground plane estimation techniques. In some cases, the data processing system may designate the unknown object as a false positive based on the first subset of the set of data points not satisfying a threshold, the threshold corresponding to a number of data points. At 1116, the data processing system generates, using the mask image and the first subset of the set of data points, a 3D bounding box for the unknown object (e.g., a bounding box that fits the foreground points of the first subset). In some implementations, the data processing system can execute an object recognition model using the 3D bounding box for the unknown object. Therefore, the object recognition model may estimate a 3D bounding box for the unknown objects.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
receiving, by a processor, from a sensor of an autonomous vehicle, an image of an environment outside of the autonomous vehicle;
identifying, by the processor, a mask image for a road surface and an unknown object using a panoptic segmentation model;
extracting, by the processor, a two-dimensional bounding box for the unknown object;
retrieving, by the processor, a set of data points received from a LiDAR sensor of the autonomous vehicle monitoring the environment of the autonomous vehicle;
identifying, by the processor, a first subset of the set of data points corresponding to foreground data points and a second subset of the set of data points corresponding to background data points; and
generating, by the processor, using the mask image and the first subset of the set of data points, a three-dimensional bounding box for the unknown object.

2. The method of claim 1, further comprising:
predicting, by the processor, a ground plane for the set of data points received from the LiDAR sensor.

3. The method of claim 1, further comprising:
executing, by the processor, an object recognition model using the three-dimensional bounding box for the unknown object.

4. The method of claim 1, further comprising:
projecting, by the processor, the set of data points onto the mask image.

5. The method of claim 4, wherein the processor projects the set of data points in a region associated with the unknown object.

6. A system comprising:
one or more processors, wherein the one or more processors are configured to execute instructions on a non-transitory computer-readable medium to:
receive, from a sensor of an autonomous vehicle, an image of an environment outside of the autonomous vehicle;
identify a mask image for a road surface and an unknown object using a panoptic segmentation model;
extract a two-dimensional bounding box for the unknown object;
retrieve a set of data points received from a LiDAR sensor of the autonomous vehicle monitoring the environment of the autonomous vehicle;
identify a first subset of the set of data points corresponding to foreground data points and a second subset of the set of data points corresponding to background data points; and
generate, using the mask image and the first subset of the set of data points, a three-dimensional bounding box for the unknown object.

7. The system of claim 6, wherein the instructions further cause the one or more processors to:
predict a ground plane for the set of data points received from the LiDAR sensor.

8. The system of claim 6, wherein the instructions further cause the one or more processors to:
execute an object recognition model using the three-dimensional bounding box for the unknown object.

9. The system of claim 6, wherein the instructions further cause the one or more processors to:
project the set of data points onto the mask image.

10. The system of claim 9, wherein the one or more processors project the set of data points in a region associated with the unknown object.

11. A non-transitory computer readable medium including one or more instructions stored thereon and executable by a processor to:
receive, from a sensor of an autonomous vehicle, an image of an environment outside of the autonomous vehicle;
identify a mask image for a road surface and an unknown object using a panoptic segmentation model;
extract a two-dimensional bounding box for the unknown object;
retrieve a set of data points received from a LiDAR sensor of the autonomous vehicle monitoring the environment of the autonomous vehicle;
identify a first subset of the set of data points corresponding to foreground data points and a second subset of the set of data points corresponding to background data points; and generate, using the mask image and the first subset of the set of data points, a three-dimensional bounding box for the unknown object.

12. The non-transitory computer readable medium of claim 11, wherein the one or more instructions executable by the processor to:

predict a ground plane for the set of data points received from the LiDAR sensor.

13. The non-transitory computer readable medium of claim 11, wherein the one or more instructions executable by the processor to:

execute an object recognition model using the three-dimensional bounding box for the unknown object.

14. The non-transitory computer readable medium of claim 11, wherein the one or more instructions executable by the processor to:

project the set of data points onto the mask image.

\* \* \* \* \*